Figure 1:
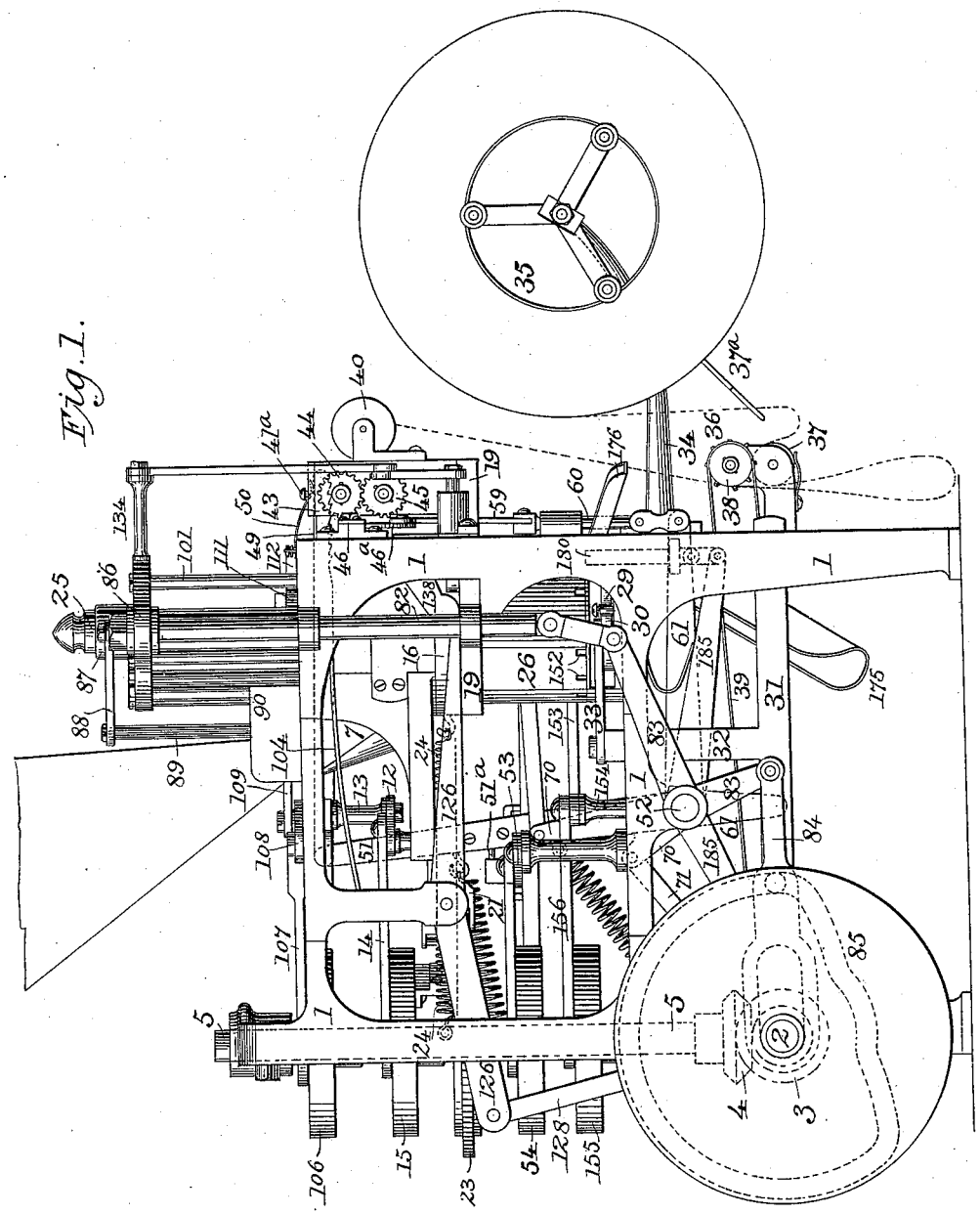

(No Model.)  8 Sheets—Sheet 1.

G. H. & F. D. HAYDEN.
CIGARETTE MACHINE.

No. 595,474. Patented Dec. 14, 1897.

Witnesses
Inventors
George H. Hayden,
Frank D. Hayden,
Attorneys (No Model.)

G. H. & F. D. HAYDEN.
CIGARETTE MACHINE.

No. 595,474.

8 Sheets—Sheet 2.

Patented Dec. 14, 1897.

Witnesses

Inventors
George H Hayden,
Frank D Hayden,
Attorneys (No Model.) 8 Sheets—Sheet 3.
G. H. & F. D. HAYDEN.
CIGARETTE MACHINE.
No. 595,474. Patented Dec. 14, 1897.
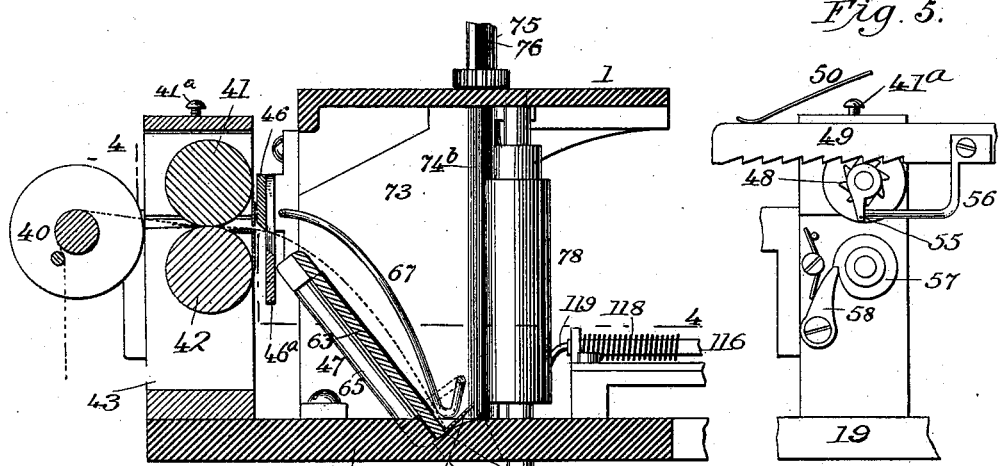
Witnesses
Sidney P. Hollingsworth
Arthur B. Seibold
Inventors
George H Hayden,
Frank D Hayden,
by their Attorney

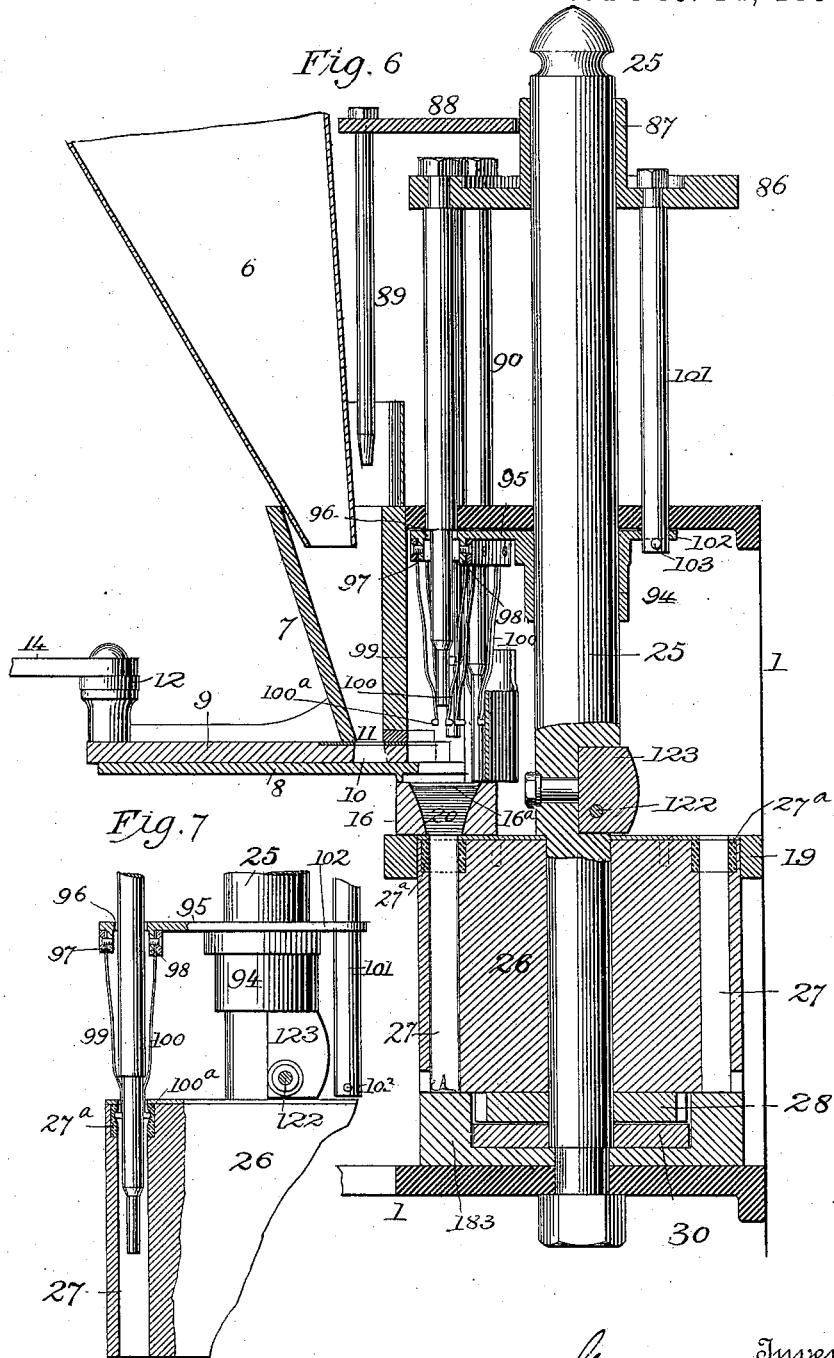

(No Model.) 8 Sheets—Sheet 5.
G. H. & F. D. HAYDEN.
CIGARETTE MACHINE.
No. 595,474. Patented Dec. 14, 1897.
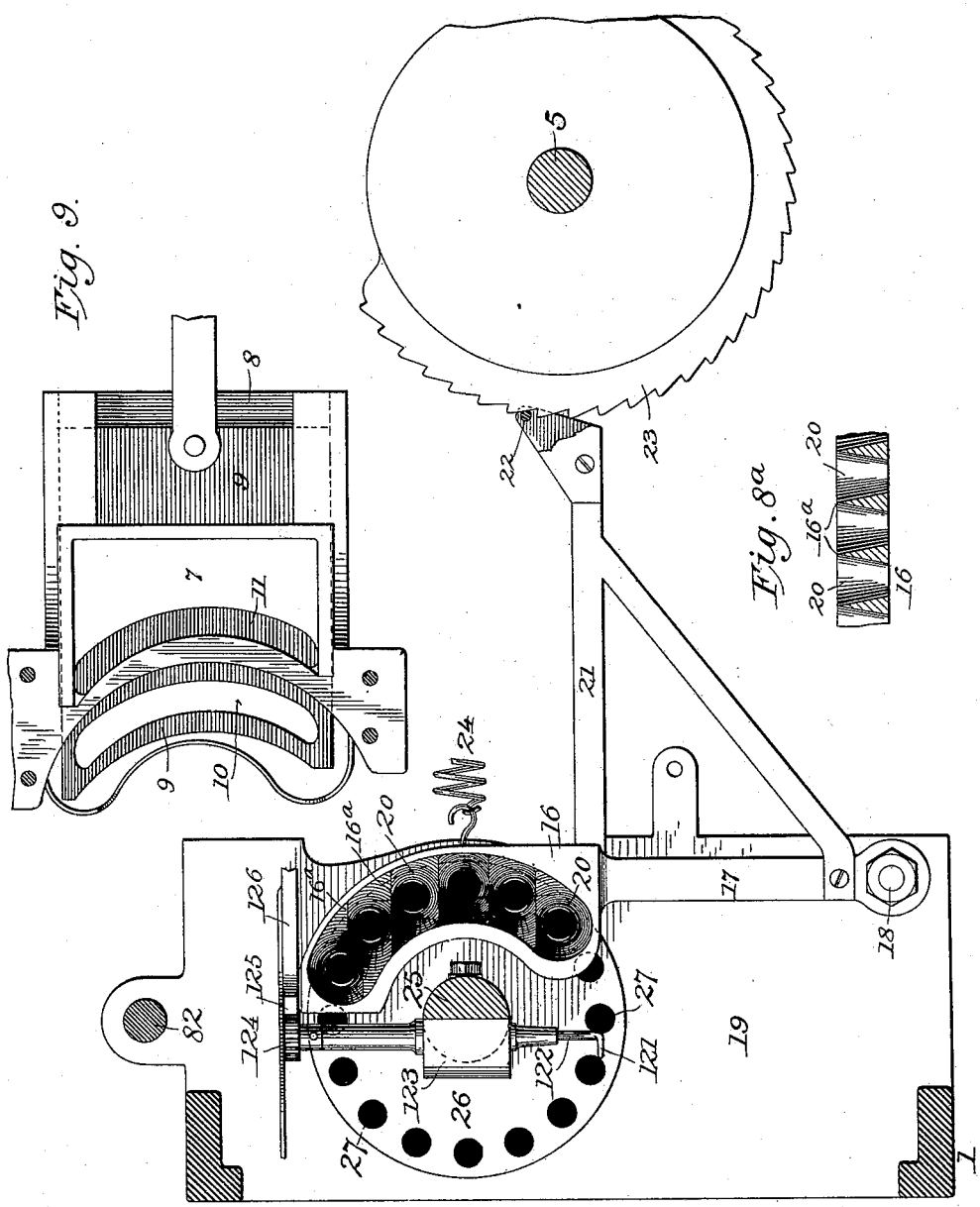
Witnesses Inventors (No Model.)　　　　　　　　　　　　　　　　　　8 Sheets—Sheet 6.
G. H. & F. D. HAYDEN.
CIGARETTE MACHINE.

No. 595,474.　　　　　　　　　　　Patented Dec. 14, 1897.

(No Model.) 8 Sheets—Sheet 7.
G. H. & F. D. HAYDEN.
CIGARETTE MACHINE.
No. 595,474. Patented Dec. 14, 1897.
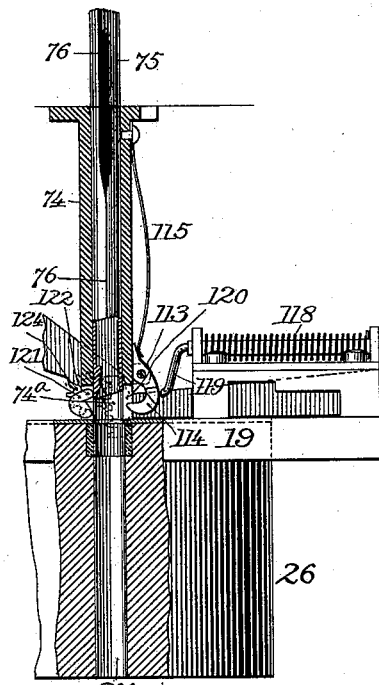
Fig. 12.
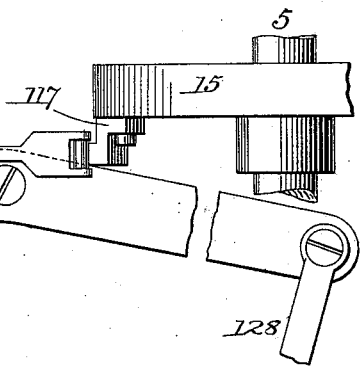
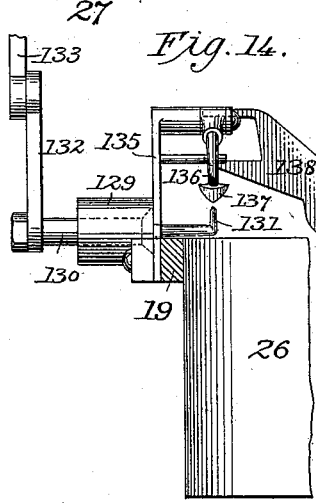
Fig. 13.
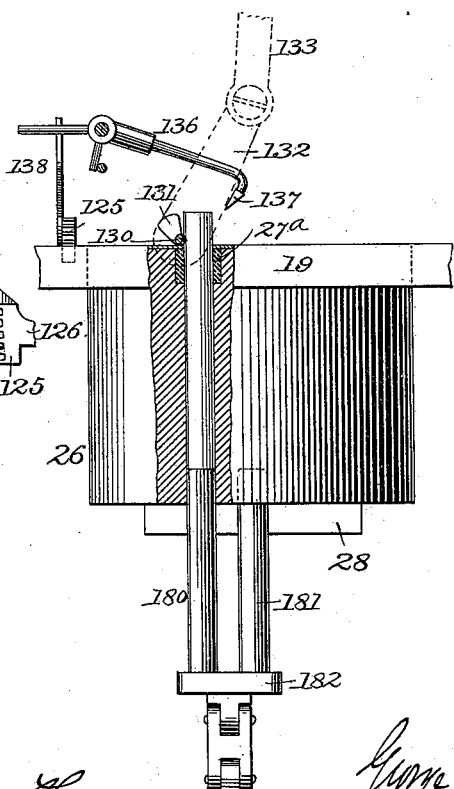
Fig. 14.
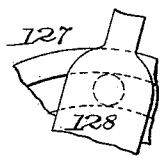
Witnesses
Inventors
George H. Hayden,
Frank D. Hayden
Attorneys
THE NORRIS PETERS CO., PHOTO-LITHO., WASHINGTON, D. C.

(No Model.) 8 Sheets—Sheet 8.

G. H. & F. D. HAYDEN.
CIGARETTE MACHINE.

No. 595,474. Patented Dec. 14, 1897.

Witnesses
Sidney P. Hollingsworth
Arthur B. Seibold

Inventors
George H. Hayden
Frank D. Hayden
by their Attorneys

UNITED STATES PATENT OFFICE.

GEORGE H. HAYDEN AND FRANK D. HAYDEN, OF RICHMOND, VIRGINIA, ASSIGNORS TO THE HAYDEN CIGARETTE MACHINE COMPANY, OF SAME PLACE.

CIGARETTE-MACHINE.

SPECIFICATION forming part of Letters Patent No. 595,474, dated December 14, 1897.

Application filed June 1, 1897. Serial No. 638,983. (No model.)

*To all whom it may concern:*

Be it known that we, GEORGE H. HAYDEN and FRANK D. HAYDEN, citizens of the United States, residing at Richmond, in the county of Henrico and State of Virginia, have invented certain new and useful Improvements in Cigarette-Machines, of which the following is a full, clear, and exact description.

The object of our invention is to produce a machine of the class used for manufacturing what is known as the "Spanish," "Cuban," "Mexican," or "folded-end" cigarette—that is to say, a cigarette which consists of a filler, preferably of granular or flake tobacco, inclosed by an unpasted paper wrapper, but which has its ends folded or tucked in, whereby the wrapper is held securely around the filler, yet permitting the cigarette to be readily opened for rolling by hand, which is the custom of users of this form of cigarette.

To this end our invention consists of an organized machine as a part of the operation of which a web of paper is fed by suitable means to a cutting mechanism which severs the web a length sufficient to form the wrapper of a cigarette. The severed wrapper is then carried to a device for forming it into a cylinder or tube and tucking or folding its lower end, after which it is placed as a shell within an opening in a rotating cylinder and conveyed to the filling mechanism. The cylinder contains a sufficient number of openings or bores to make the operation of the machine continuous. Tobacco is fed in the machine herein described to six wrapper-shells at one time, each getting during one-sixteenth of the rotation of the cylinder one-sixth of the quantity necessary to form a cigarette. After each wrapper-shell has received its proportional amount of tobacco a rod descends, packing the tobacco therein, the cigarette being thus more evenly packed and filled by consecutive operations than would be the case if the entire quantity of tobacco to form a cigarette were introduced into the shell at one time. The filled and packed wrapper-shell then passes by rotation of the cylinder to second tuckers, which close the upper end of the shell, each cigarette after this final operation being ejected from the machine.

Figure 2:
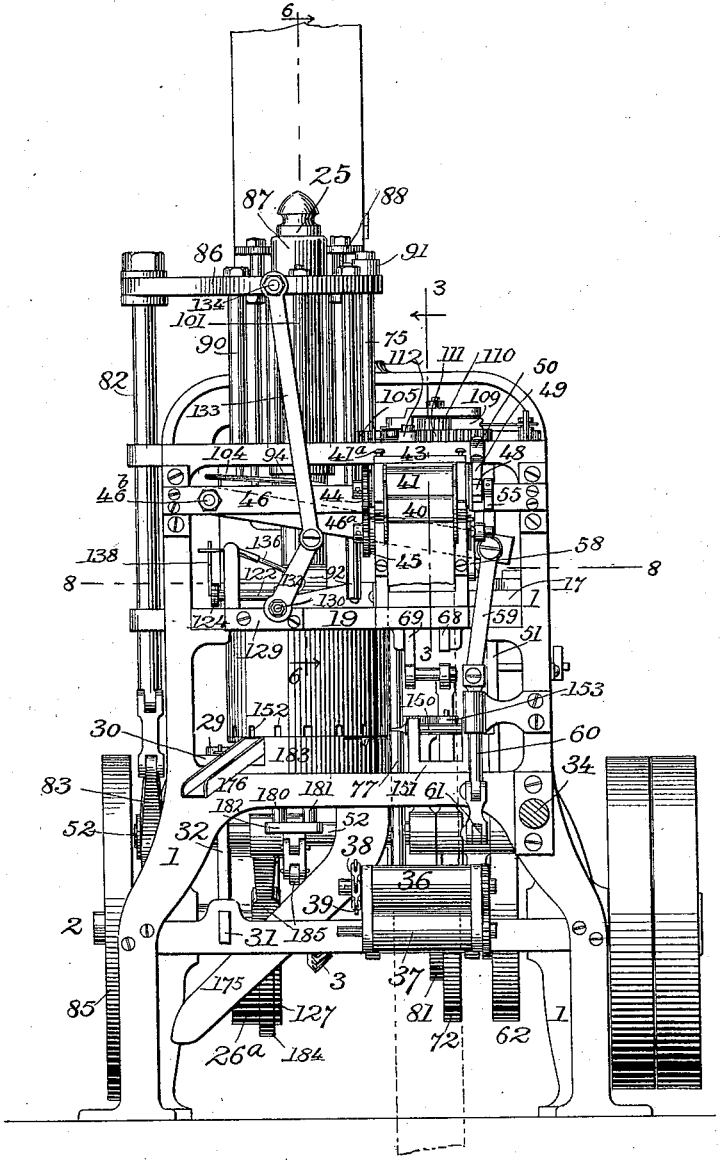
Figure 10:
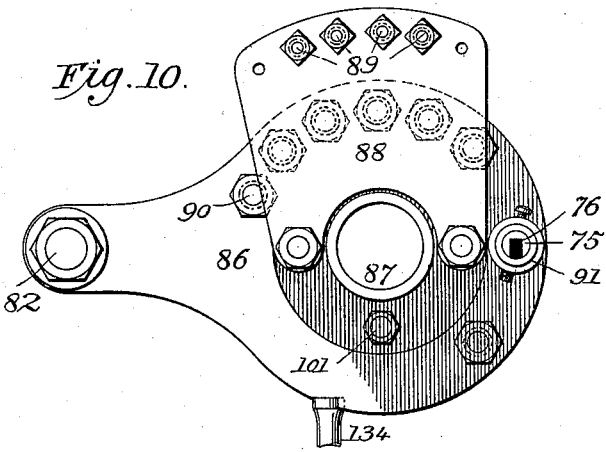
Figure 11:
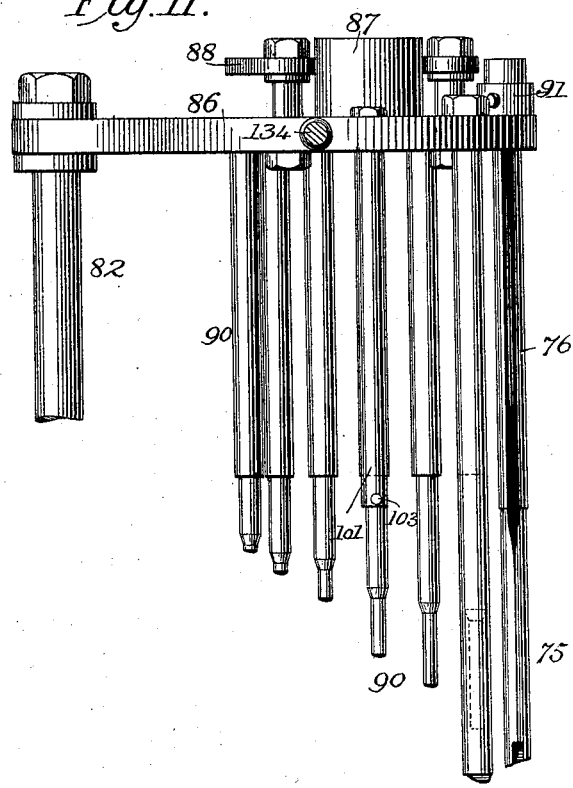
Figure 15:
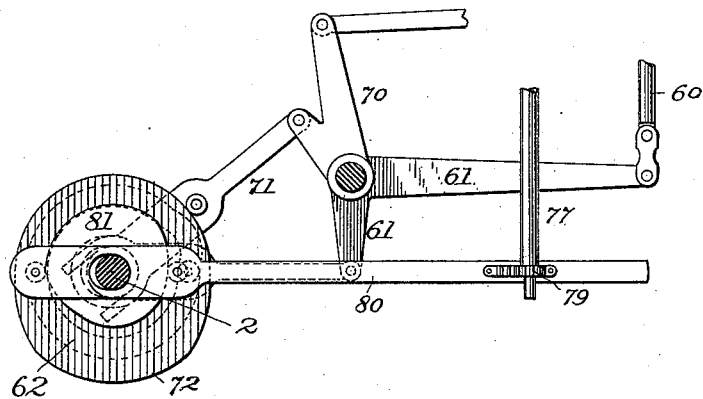
Figure 16:
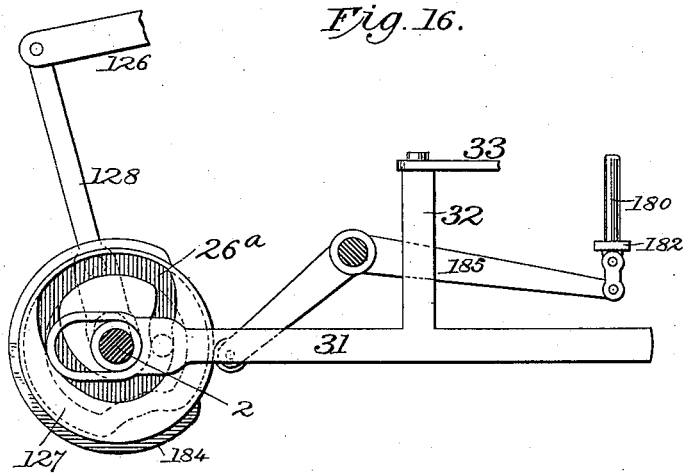
Figure 17:
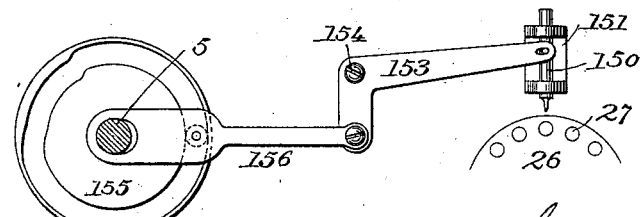

Referring to the drawings, Figure 1 is a side elevation of our improved machine. Fig. 2 is a front elevation of the same. Fig. 3 is a vertical section on the line 3 3 of Fig. 2, looking in the direction of the arrow. Fig. 3$^a$ is a detail. Fig. 4 is a horizontal section on the line 4 4 of Fig. 3, the parts being in a different position. Fig. 5 is a side view of the intermittent paper-feeding mechanism. Fig. 6 is a vertical section on the line 6 6 of Fig. 2, looking in the direction of the arrow. Fig. 7 is a detail of a portion of Fig. 6. Fig. 8 is a horizontal section on the line 8 8 of Fig. 2. Fig. 8$^a$ is a detail. Fig. 9 is a plan view of the secondary hopper hereinafter described. Fig. 10 is a plan view of a portion of the machine. Fig. 11 is a front elevation of the same. Figs. 12, 13, and 14 illustrate the mechanisms for tucking the two ends of a cigarette. Figs. 15, 16, and 17 illustrate in detail several of the cams and how various parts of the machine are operated by them.

Similar numerals of reference indicate similar parts in the respective figures.

The main frame 1, by which the various parts are carried, is by preference made in skeleton form, as shown, which will permit of easy access to and inspection of the parts when desired. Journaled upon the frame 1, at the rear and near the bottom thereof, is the main driving-shaft 2, to which is keyed or otherwise secured a beveled gear-wheel 3, which engages with a second beveled gear-wheel 4 on the lower end of a vertical shaft 5, the latter turning in bearings in the longitudinal center of the machine at or near the rear. The shafts 2 and 5 carry the cams which give motion to the several devices for feeding the paper and tobacco and are employed in various other operations for producing the complete cigarette. A shaft or rod 25, securely fixed at its lower end to the main frame, near the front thereof, extends in a vertical direction above the frame. Surrounding this shaft and adapted to rotate thereon is a cylinder 26, provided concentrically near its periphery with sixteen (more or less) axial openings 27, within which the paper shells are introduced and packed with tobacco and the cigarettes are finished. The height of the cylinder is about one-fourth of an inch greater than the length of the finished cigarette, its upper surface being flush with the top of the plate 19. A ratchet-wheel 28 on the bottom of the cylinder 26 and a pawl 29 on a rocking plate 30 rotate the cylinder 26 intermittently by means of a cam 26ª, mounted on the main driving-shaft 2, said cam operating a slide-bar 31, having an upright arm 32, connected to the rocking plate 30 by a link 33. The teeth on the ratchet-wheel 28 correspond in number with the openings 27 in the cylinder 26, thereby intermittently rotating the cylinder through a space equal to the distance between the centers of two adjacent openings 27.

Supported by an arm 34, attached to the front of the machine and rotating on a pin secured to the said arm, is a reel 35 for the web of paper, the latter being of a width slightly in excess of the circumference of the cigarette. This paper passes from the reel 35 to a pair of continuously-rotating feed-rolls 36 37, between which it is fed, a guide 37ª being interposed between the reel of paper and the feed-rolls. On the shaft of the upper feed-roll 36 is fixed a sprocket-wheel 38, rotated by means of a chain 39, driven by a sprocket on the main driving-shaft 2. The paper extends downwardly for some distance in the form of a loop, passing thence upwardly to and over a guide 40 to a pair of feed-rolls 41 42, adapted to intermittently rotate in a frame 43, attached to a forward projection from the plate 19. The rolls 41 42, which are geared together by toothed wheels 44 45, feed the paper between a pair of cutting-knives 46 46ª to a vibrating carrier 47. The feed-rolls 41 42, the former of which is held in bearings adjusted by means of screws 41ª, are turned intermittently by any suitable agency, as in Fig. 5, where 48 represents a toothed or ratchet wheel pinned to the shaft of the feed-roll 41. A toothed bar 49 engages the ratchet-wheel 48 and is kept in contact therewith by a spring 50. The rear end of the toothed bar 49 is pivoted to an upright lever 51, adapted to rock on fixed shaft 52. A horizontal lever 53, pivoted at one end to a support secured to the frame is operated, through the medium of a connecting-bar, by a cam 54 on the upright shaft 5. The free end of the lever 53 is pivoted to the upright lever 51 at 51ª, by which means motion is given to the latter lever. The lever 51, on being rocked by the cam 54 through its connections, moves the bar 49 forward a sufficient distance to give one complete rotation to the rolls 41 42, the diameter of the rolls being such that one rotation thereof is sufficient to feed enough paper to form a cigarette. This movement being a quick one there would be a liability of the rolls turning too far and feeding more than the requisite length of paper were not means provided to stop the rolls when the exact length has been fed. A simple device for accomplishing this result is provided in the finger 55 on the shaft of the roll 41, which comes in contact at the proper time with a stop 56, depending from the bar 49. On the shaft of the lower roll 42 is a ratchet-disk 57, which is engaged by a pawl 58, pivoted to the frame 43 to prevent the rolls 41 42 from turning backward as the bar 49 is retracted, the spring 50 yielding and allowing the bar 49 in its backward movement to pass over the teeth of the ratchet-wheel 48 without engaging them.

The wrapper-cutting device consists of a fixed blade 46, screwed to the front of the main frame, as will be seen in Figs. 1 and 2, and a movable blade 46ª, pivoted at 46ᵇ. A link 59, one end of which is pivoted to the free end of the blade 46ª, is connected at its opposite end to a slide 60, which in turn is attached to the forward end of an elbow-lever 61, by means of a link, as indicated. The elbow-lever 61, which rocks on the fixed shaft 52, is connected by a suitable rod to its operating-cam 62 on the main driving-shaft 2.

The vibrating carrier 47, above referred to, which is pivoted at 47ª below the plate 19, stands normally in a position inclined toward the cutting devices, and consists of a bed 63, having a guard-plate 64 on its outer side and a roller 65 on its inner side. The roller 65 turns freely in bearings at the top and bottom of the bed 63 and is so arranged that the periphery of the roller 65 is slightly above the upper surface of the bed. A foot-piece 66 on the bottom of the carrier 47 forms a support for the severed wrapper, while a guide 67, also attached to the carrier, directs the wrapper in the direction of the foot-piece. Arms 68 69, through which passes the pivot 47ª, are connected to the bottom of the vibrating carrier, one of the arms, as 69, extending beyond the pivot and being connected by a link to a lever 70, which rocks on the fixed shaft 52 when operated by a cam 72 through the medium of a bar 71. By means of the cam 72 the vibrating carrier is moved from the inclined position shown in Fig. 3 to the vertical position seen in Fig. 4.

Screwed to the plate 19, with one side in close proximity to the vibrating carrier 47, is a vertical plate 73, its rear end being provided with an enlargement 74, having a circular opening 74ª therethrough in a vertical direction, the axis of which lies in the plane of the bed 63, when the vibrating carrier is raised to the vertical position, as will be observed on reference to Fig. 4. The wall of this circular opening 74ª is cut away on the side next the vibrating carrier, forming a slot 74ᵇ, as is clearly seen in Figs. 3 and 4. Through the opening 74ª is passed a rod 75, adapted to rotate and move longitudinally therein. The rod 75 has a slot 76 throughout its entire length, as shown in Fig. 11, the upper portion of which slot is much wider than the lower portion, the width of the latter being but slightly in excess of the thickness of the wrapper. The construction is such that the edge of the severed wrapper may be easily introduced into the slot at its widest part, and then upon the raising of the rod 75 the said wrapper passes down to the narrow portion and is held firmly enough to be rolled into a tube when the rod 75 is rotated. The lower end of the rod 75 is slightly reduced in diameter, as shown, in order that the rod at this point with the wrapper around it may not be of a greater diameter than the upper or uncovered portion of the rod.

A vertical shaft 77, journaled in the main frame, carries a roller 78 at its upper end above the plate 19 in position to bear against the roller 65 on the vibrating carrier when brought to a vertical position, as indicated in Fig. 4. The roller 78 is turned by means of a pinion 79 upon the lower end of the shaft 77, which meshes with a rack on a bar 80, reciprocated by a cam 81, mounted on the main driving-shaft 2.

From the above it will be understood that when a sufficient length of paper to form a wrapper has been fed by the vibrating carrier 47 the cutting device severs it from the continuous web, and that the wrapper thus severed settles into the carrier over the roller 65. The vibrating carrier 63 is then brought to the vertical position seen in Fig. 4, bringing the roller 65 and the severed wrapper thereon in contact with the roller 78. In this position the inner edge of the wrapper is in line with the slot 74$^b$ in the plate 73 and the slot 76 in the rod 75. The bar 80 with its rack now advances, rotating the pinion 79 and the roller 78, which, being in frictional contact with the roller 65, carries the wrapper positively into the slot 76. Both the rollers 65 and 78 are or may be covered with some elastic substance, as rubber, to insure their mutual grip upon the wrapper held between them. The rod 75 being at this time in its lowest position now rises until the edge of the wrapper is wholly within the narrowest portion of the slot 76. The vibrating carrier is then returned to its normal or inclined position, the rod 75 being at the same time rotated, as hereinafter described, which action causes the paper to be wrapped about the rod, thus forming a tube. The wrapper being now in tubular form, the next step is to fold or tuck the lower end thereof so as to form the tube into a shell, which is done by mechanism now to be described.

Pivoted to a stud 113, near the bottom of the enlargement 74 of the plate 73, is a tucking-hook 114, a spring 115 bearing on the tailpiece of the said tucking-hook to keep it retracted. A horizontal bar 116, sliding in bearings secured to the plate 19, is moved in a forward direction by a cam-block 117, bolted to the cam-wheel 15, and retracted by a spring 118, surrounding the said sliding bar. A finger 119, secured to the forward end of said sliding bar, is shaped so as to engage with the tucking-hook 114 when the sliding bar 116 is pushed forward by the cam-block 117, which action will cause the hook to swing on its pivot through the opening 120, formed in the wall of the enlargement 74, this giving the end of the wrapper-tube its first fold. A second tucker 121, opposite the tucking-hook 114 and shaped like a curved blade or knife, is secured to the end of the horizontal shaft 122, placed transversely of the machine. The shaft 122 has its bearing in a block 123, bolted to the fixed shaft 25, through which block the shaft 122 passes to the opposite side, where it is provided with a pinion 124 in engagement with a curved rack 125 on the end of a vibrating lever 126, the latter being pivoted to the main frame and operated by a cam 127, engaging a stud or roller on a connecting-yoke 128. The parts are so timed that the tucker-hook 114 has finished its operation before the tucker 121 commences its action. The tucker 121, from its peculiar shape and action, not only turns the end of the wrapper-tube over the extremity of the rod 75, but pushes said end of the tube into the rod, which is made hollow to receive it.

A vertical rod 82, supported by and adapted to slide in guides situated at the side of the main frame, is connected by a link to an elbow-lever 83, which is operated, through the medium of a yoke 84, by a cam-wheel 85, by which means the rod 82 is given reciprocation in vertical direction.

A plate 86, bolted to the upper end of the vertical rod 82, projects inwardly, from the upper face of which a sleeve 87 rises, the rod 25 passing through the sleeve. A second plate 88, which is secured to the plate 86 and overhangs it on the rear, has depending therefrom a series of rods or fingers 89, which move up and down with the plates 86 88 and rod 82.

Depending from the rear of the plate 86 is a series of packing-rods 90, here shown as six in number, each rod decreasing in length in the direction in which the cylinder 26 is revolving, or as they are consecutively introduced into the paper shells, each having an increased amount of tobacco. The rods are throughout a portion of their length reduced in diameter, as will be seen on referring to Fig. 11, the reduced portions being those which are introduced into the paper shells. The rods when in elevated position stand vertically above the cells 20 in the agitator 16, Figs. 6 and 8, the openings 27 in the cylinder 26 being under the rods, so that the rods shall enter the openings when the plate 86 descends. The rod 75, heretofore described, has fixed to its upper end a sleeve 91, Figs. 1 and 2, adapted to rotate in an opening in the plate 86. A pinion 105, through which the rod 75 moves freely in a longitudinal direction, has a stud or projection which enters the slot of the rod. The arrangement is such that the rod 75 rotates with the pinion, but has an endwise movement independently thereof. A cam 106 on the vertical driving-shaft 5 operates a yoke 107, pivoted to a cross-lever 108, by means of which a ratchet-bar 109 is caused to move backward and forward. The ratchet-bar 109 operates a ratchet-wheel 110, secured to a gear-wheel 111, in engagement with the pinion 105. As thus arranged the advance of the ratchet rotates the bar 75 once or oftener, as desired, while during its retreat the gear and pinion are held against rotation by a pawl 112, pivoted to the top of the frame and engaging with the gear-wheel 111.

The descent of the plate 86, as heretofore described, brings down the rod 75 with it. This movement forces the paper shell which surrounds the rod 75 out of the opening 74ª in the plate 73 into one of the openings 27 in the cylinder 26. The rod then rises, leaving the shell in the opening 27.

To prevent the shell from being withdrawn with the rod 75 when it rises, a holding device, such as is seen in Figs. 2 and 17, is used. It consists of a pointed pin 150, or it may be a rod, having fastened to its end a small flat piece of rubber sliding in bearings 151 and adapted to enter the openings 27 in the cylinder 26 through notches 152 in the bottom of the said cylinder, as indicated. An elbow-lever 153, Figs. 1 and 17, pivoted to fixed support 154 and to the pin 150, operates the latter by means of cam 155 and connecting-rod 156. Just before the rod 75 is raised the point of the pin enters the paper shell, or, where the rubber-tipped rod is used, it presses upon the shell through the notch 152, then in position, and holds it until the rod has passed from within the shell. It then returns to its first position to permit the cylinder to rotate.

Surrounding the bar 25 and moving freely thereon is a sleeve 94, Fig. 6, from which an extension 95 projects rearwardly beyond the rods 90, which rods pass through openings 96, formed in the extension. Curved flanges 97 98 depend from the under face of the extension 95 on opposite sides of the openings 96, to which spring-fingers 99 100 are secured by plates and screws. The spring-fingers, of which there are two for each rod 90, carry on their lower or free ends bead-like extensions 100ª, the use of which is hereinafter described.

A rod 101, bolted to the plate 86, passes freely through an opening in a bracket 102 on the front of the sleeve 94. A pin 103 on the rod below the bracket 102 keeps the sleeve and the attached parts in elevated position and raises them at the proper time when lowered. A spring 104, Fig. 1, attached to the frame, bears on a pin projecting from the sleeve 94 to depress it and the spring-fingers when the rod descends.

When the plate 86 descends, bringing with it the packing-rods 90, the rod 75, and the rod 101, the sleeve 95, to which are attached the spring-fingers, as previously described, through the action of gravity and under the influence of the spring 104, descends with it until it is stopped by the bearing-block 123. (Seen in Figs. 6 and 7.) In this position the spring-fingers 99 100 will have descended to a point where their free ends, with their bead-like extensions attached, as heretofore mentioned, will be a short distance within the holes or openings 27 of the cylinder 26, the holes 27 having at this point rubber sides 27ª, as shown in Fig. 7. The plate 86 and the several attached rods, however, continue to descend until they have reached their full limit of movement, the rod 101 sliding freely through the bracket 102. The packing-rods 90, which continue their downward movement after the spring-fingers have stopped, will by their shape press the bead-like ends of said fingers against the paper shell which has been placed in the opening 27, as heretofore described, against the yielding elastic material 27ª. This is done for the purpose of insuring that the paper shells may not be crushed or packed down along with the tobacco when the packing-rods descend.

Tobacco is supplied to the machine through a hopper capable of holding several pounds, preferably of the variety known as "granular" or "flake" tobacco. The hopper 6 is secured above the machine in any convenient manner, with its outlet extending a short distance into a smaller receiving-hopper 7, Fig. 6, which forms a part of the tobacco-feeding device. Secured to the bottom of the receiving-hopper 7 and projecting rearwardly therefrom in a horizontal direction is a plate 8, the sides of which are raised above the surface of the said plate and grooved for the reception of a slide 9, through which a curved slot 10 is made. The slot 10 registers with the outlet 11 in the bottom of the receiving-hopper 7, which outlet has a curvature similar to that of the slot 10. A lever 12, Fig. 1, is pivoted at one end to a fixed support 13, depending from the top of the main frame, while the opposite end of the said lever is in turn pivoted to the slide 9. A connecting-rod 14, operated by a cam 15 on the vertical shaft 5, is connected to the lever 12, through which motion is imparted to the slide 9.

The rods 89, heretofore described, are placed vertically above the secondary hopper 7, into which they enter as they descend, stirring the tobacco contained therein and pressing it into the curved slot 10 of the slide 9. The quantity of tobacco thus pressed into the slot 10 determines the amount of tobacco contained in each cigarette and the compactness thereof. By increasing the number of rods 89 more tobacco will be pressed into the curved slot, and consequently the cigarettes will contain more tobacco and be packed more tightly.

It is to be understood that the rods 89 stir the tobacco in a measure when they enter and pass out of the secondary hopper 7. The yielding nature of the tobacco permits the rods to pass partially through it, but at the same time force a portion of the said tobacco into the slot 10. When the rods are withdrawn, the tobacco, being in a dry condition, flows into the spaces occupied by the fingers and is in this sense stirred.

Below the plate 8 and slightly in advance thereof is the agitator and divider 16, Figs. 6 and 9, having an arm 17 extending laterally therefrom, pivoted at 18 to the plate 19, fixed to the main frame 1. The agitator 16, which is of curved form, is provided with cells 20, preferably six in number, smaller at the bottom than at the top, as indicated in Figs. 8 and 8ª. These openings or cells, which are divided by knife-edges 16ª, are made in this manner so that the tobacco, which is fed to the agitator 16 through the bottom of the slide 9, may be equally divided and by its shaking or agitation fed into the shells which are in the holes 27 of the cylinder 26. An arm 21, which extends rearwardly from the agitator 16, is provided with a roller 22, which engages the serrated periphery of a disk 23 on the vertical shaft 5. A spiral spring 24, connected to the rear of the agitator 16, keeps the roller 22 always in contact with the serrated disk 23.

A second pair of tuckers or folders for the opposite end of the cigarette is represented in Figs. 2, 13, and 14. Bolted to the front of the plate 19 is a bearing 129, from which rises a support 135, and on which is pivoted a tucker-arm 136, having a wedge-shaped point 137. A notched plate 138, attached to the lever 126, engages a pin projecting from the hub of the tucker-arm 136 to operate the said tucker. Through the bearing 129 a short shaft 130 passes, its inner end carrying a thin tucking-blade 131. On the outer end of the shaft 130 is fastened an arm 132, connected by a link 133 to a stud 134, Fig. 1, projecting from the plate 86, which carries the packing-rods.

Below the main frame, at the front, and rising vertically therethrough, are two parallel rods 180 181, which slide freely through the frame and through a disk 183, on which the cylinder 26 rotates. These rods are in such relation to the openings 27 of the cylinder 26 that when the cylinder is at rest the rods 180 181 will be immediately under the cigarette about to be finally closed and the one previously completed, respectively. As the rods rise through the action of a suitable cam and enter the openings 27 the rod 180 raises the unfinished cigarette until a sufficient length of shell or wrapper to be tucked projects above the upper surface of the cylinder. The rod 181 enters the opening containing the previously-tucked cigarette, as stated, for the purpose of holding, in connection with the rod 180, the cylinder 26 against rotation. A cam 184 acts on a lever 185 to move the rods at the proper time.

A rod 92, having a thin extension at its lower end, is secured to and reciprocates with the plate 86 for the purpose of ejecting the finished cigarette, which is completed when the cylinder has brought it to the point under this rod. The purpose of having an edge on this rod is that in pushing upon the end of the cigarette in ejecting it it may the more thoroughly complete the work performed by the tuckers which have made the head.

The rod 92 is in such position relatively to the last tuckers that when the plate 86 descends the rod 92 will push the completed cigarette through the opening 27 in the cylinder 26 into a spout 175, by which it is delivered into a suitable receptacle. A spout 176, placed as shown in Fig. 2, carries any loose tobacco and tobacco-dust away from the machine to be collected and used again.

The machine hereinbefore described produces a cigarette of the description mentioned in no way distinguishable from those made skilfully by hand and is compact and light and without undue complication of parts.

It is obvious that this machine might be used for packing spices, starch, &c., in paper tubes having tucked ends without any essential change in the machine, excepting that it would be necessary in packing said articles to enlarge the main operative parts.

Having thus described our invention, we claim—

1. In a paper-feeding mechanism for cigarette-machines, the combination of a continuous web-feeding device, an intermittent web-feeding device, a cutting mechanism, and a vibrating wrapper-feeding device, substantially as set forth.

2. In a cigarette-machine, the combination of a duplex paper-feeding device, consisting of a continuous and an intermittent feeding mechanism, a cutting device, a tube-former, and a vibrating wrapping-feeding device for delivering the severed wrapper to the tube-former, substantially as described.

3. In a cigarette-machine, the combination of a paper-web-feeding mechanism, means for severing a wrapper from the said web, a tube-former, a vibrating wrapping-feeding device and means for forming the tube from the wrapper, and tucking one end thereof, substantially as described.

4. In a cigarette-machine, the combination of a feeding mechanism, a vibrating carrier, a tube-forming mechanism and means for delivering the wrapper from the carrier to the tube-forming mechanism, substantially as described.

5. In a cigarette-machine, the combination of a vibrating wrapper-carrier having a flat bed, a frictionally-operated roller mounted thereon, a positively-operated roller mounted on the main frame and adapted to coact with the roller on the vibrating carrier to deliver the wrapper to the tube-forming mechanism, substantially as described.

6. In a cigarette-machine, the combination of wrapper-feeding mechanism, a vibrating carrier, a tube-forming mechanism, means for delivering the wrapper from the carrier to the tube-forming mechanism, and means for tucking one end of the tube, substantially as described.

7. In a cigarette-machine, a wrapper-former, the same consisting of a rod having a slot in one side, the said slot being wider at one end than at the other, and means for giving the rod both a longitudinal and a rotary movement, substantially as described.

8. In a cigarette-machine, a wrapper-tube-forming rod having a longitudinal slot therein of greater width at one end than at the other, in combination with means for introducing the wrapper into the wide portion of the slot, means for moving the tube longitudinally until the wrapper enters the narrow portion of the slot, and means for rotating the rod, substantially as described.

9. In a cigarette-machine, a wrapper-tube-forming rod having a longitudinal slot from end to end, one end of the slot being narrower than the other end, in combination with a pinion adapted to rotate the rod, the latter being adapted to slide freely endwise through the said pinion, substantially as described.

10. In a cigarette-machine, the combination of a wrapper-tube-forming rod having a slot in one side wider at one end than at the other, a plate, through an opening in which the rod passes and in which the wrapper-tube is formed, the said plate having a slot opposite the slot in the rod, and means for delivering the wrapper to the rod, substantially as described.

11. In a cigarette-machine, the combination of a slotted wrapper-tube-forming rod, one end of which is of reduced diameter, a vibrating wrapper-carrier, means for delivering the wrapper from the carrier to the wrapper-rod, and a plate having a socket for the wrapper-rod and open on one side for the passage of the wrapper, substantially as described.

12. In a cigarette-machine, the combination of a wrapper-tube-forming mechanism, means for tucking one end of the wrapper-tube to form a shell, a perforated cylinder, means for introducing the wrapper-tube former and shell into one of the perforations of the cylinder, and means for retaining the shell within the opening while the tube-former is withdrawn, substantially as set forth.

13. In a cigarette-machine, a fixed vertical shaft, a cylinder rotating thereon having a series of longitudinal openings therethrough, and means for intermittently rotating the cylinder, in combination with mechanism for forming shells from wrappers, means for delivering the shells to the openings in the cylinder, and means for holding the shells in place during the withdrawal of the delivering means, substantially as set forth.

14. In a cigarette-machine, the combination of a vertical shaft, a longitudinally-perforated intermittently-rotatable cylinder turning thereon, means for delivering the shells to the perforations in the cylinder, means for filling, packing and tucking the shells while in the cylinder, and means for holding the shells open while being filled and packed, substantially as set forth.

15. In a cigarette-machine, a longitudinally-perforated cylinder, having an elastic substance forming the walls of the upper ends of the said perforations, substantially as set forth.

16. In a cigarette-machine, a cylinder for carrying the wrapper-shells in longitudinal perforations while being filled and folded, the upper ends of the said perforations having yielding walls, in combination with means for intermittently rotating the said cylinder, substantially as described.

17. In a cigarette-machine, the combination of a secondary hopper, a slide having an opening therethrough adapted to reciprocate below the outlet of the said hopper, vertically-disposed rods, and means for operating the same, said rods being adapted to enter the hopper, stir the tobacco therein and force it into the opening in the slide, substantially as described.

18. In a cigarette-machine, the combination of a hopper, a perforated agitator below and in advance of the hopper, means for operating the agitator a perforated cylinder below the agitator, and a plate having an opening therethrough, adapted to slide forward and backward, whereby the said opening is brought alternately above the agitator and below the outlet of the hopper, substantially as described.

19. In a cigarette-machine, the combination of a hopper having a curved outlet, an agitator below and in advance of the hopper and having a series of cells or openings therethrough, means for operating the agitator, a longitudinally-perforated cylinder below the agitator, the said perforations registering with the cells in the agitator, and a plate having through it a curved opening and adapted to slide from the hopper to and above the agitator, substantially as described.

20. In a cigarette-machine, an agitator having a series of cells or openings therethrough decreasing in size from above downwardly, means for vibrating the agitator in combination with a cylinder beneath the agitator having near its periphery a series of openings, the cells in the agitator being arranged in a curved line and registering with the openings in the cylinder, substantially as described.

21. In a cigarette-machine, the combination of a hopper, an agitator having cells or openings therethrough, means for vibrating the agitator, the division-walls between the cells of the agitator being brought to a knife-edge and equally spaced, a cylinder below the agitator having perforations near its periphery, and a slide provided with an opening adapted to hold sufficient tobacco for one cigarette, whereby, when the slide is advanced over the agitator, the tobacco will be divided by the knife-edge walls into as many portions as there are cells in the agitator, substantially as described.

22. In a cigarette-machine, an agitator adapted to be vibrated in a horizontal plane, means for vibrating the agitator, cells or openings being formed therethrough and arranged in a curved line, the division-walls between the cells being brought to knife-edges, substantially as described.

23. In a cigarette-machine, the combination of the main frame, a vertical shaft fixed thereto, a longitudinally-perforated cylinder rotating thereon, a plate surrounding the shaft and adapted to slide vertically thereon, packing-rods secured to the plate and projecting downwardly, an agitator above the cylinder having openings or cells, and means for depressing the plate to carry the rods through the agitator into the openings in the cylinder, substantially as described.

24. In a cigarette-machine, the combination of a cylinder adapted to hold wrapper-shells, means for packing tobacco therein, and fingers for positively holding open the mouth of the shell, substantially as described.

25. In a cigarette-machine, the combination of a perforated cylinder adapted to hold wrapper-shells, means for feeding tobacco thereto, means for packing tobacco therein, means for positively holding the mouths of the shells open, and a yielding wall provided in each opening of the perforated cylinder, substantially as described.

26. In a cigarette-machine, the combination of a perforated cylinder, the perforations thereof being adapted to hold wrapper-shells, means for feeding tobacco to said shells, means for subdividing the tobacco into a predetermined number of portions and delivering it to an equal number of wrapper-shells, and packing-rods of progressively-decreasing length, substantially as described.

27. In a cigarette-machine, the combination of a longitudinally-perforated cylinder, pairs of fingers adapted to enter the perforations, and packing-rods also adapted to enter the said perforations between pairs of fingers, substantially as described.

28. In a cigarette-machine, the combination of a cylinder having a series of openings therethrough adapted to hold wrapper-shells, means for raising the open end of a shell a short distance above the upper surface of the cylinder, and means for closing the said open end of the said shell, substantially as described.

29. In a cigarette-machine, the combination of a cylinder to hold wrapper-shells, means for filling and packing the shells with tobacco, means for slightly elevating the open end of a shell above the end of the cylinder, and means for closing the said open end, substantially as described.

30. In a cigarette-machine, the combination of means for holding and carrying wrapper-shells each having a closed end, means for filling and packing the said shells with tobacco, means for presenting the open end of each shell to folding or tucking mechanism, the said tucking mechanism, and means for intermittently rotating the devices for holding and carrying the shell, substantially as described.

31. In a cigarette-machine, the combination of an intermittently-rotating cylinder adapted to carry wrapper-shells in suitable openings therein, means for filling and packing tobacco in the shells while in the openings, a device for raising the open end of a filled shell above the surface of the cylinder, and for locking said device against movement, a tucking or folding mechanism, and an ejector for the completed cigarette, substantially as described.

In testimony whereof we have hereunto set our hands and affixed our seals, at the city of Richmond, in the county of Henrico and State of Virginia, this 26th day of May, 1897.

GEORGE H. HAYDEN. [L. S.]
  FRANK D. HAYDEN. [L. S.]

Witnesses:
  W. A. BARRETT,
  JAS. W. BALL.